July 18, 1950     H. GILBERT     2,515,824
STOCKING SIZE GAUGE
Filed Nov. 9, 1946     5 Sheets-Sheet 1
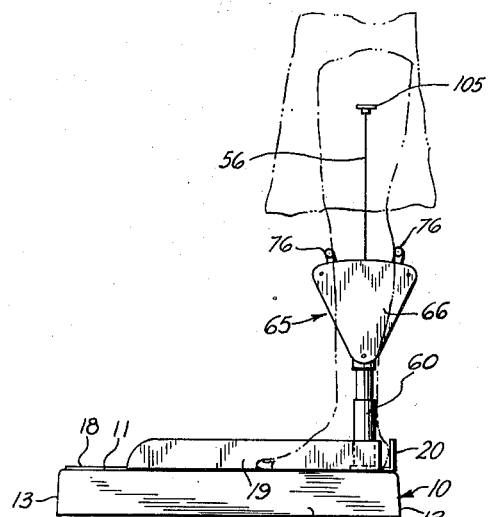
Fig. 1
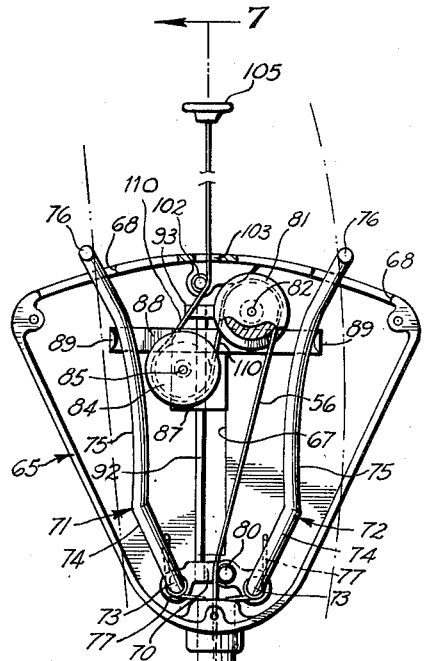
Fig. 2
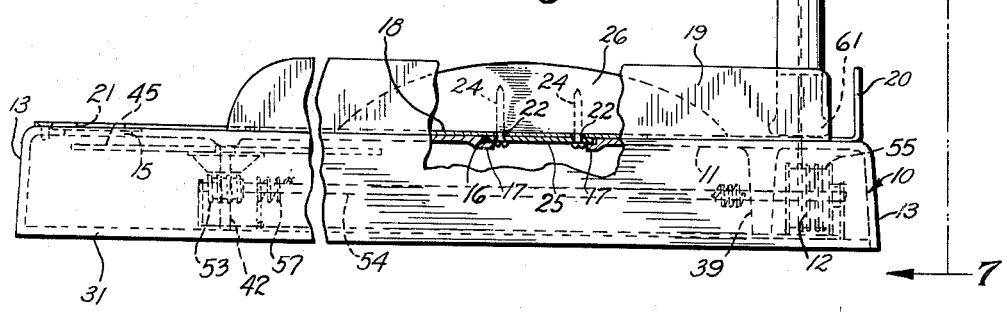
INVENTOR:
HENRY GILBERT
by his attorneys;
HARRIS, KIECH, FOSTER & HARRIS
by July 18, 1950  H. GILBERT  2,515,824
STOCKING SIZE GAUGE
Filed Nov. 9, 1946  5 Sheets-Sheet 2

INVENTOR:
HENRY GILBERT
by his attorneys;
HARRIS, KIECH, FOSTER & HARRIS

July 18, 1950  H. GILBERT  2,515,824
STOCKING SIZE GAUGE

Filed Nov. 9, 1946  5 Sheets-Sheet 3

INVENTOR:
HENRY GILBERT
by his attorneys;
HARRIS, KIECH, FOSTER & HARRIS.

July 18, 1950     H. GILBERT     2,515,824
STOCKING SIZE GAUGE
Filed Nov. 9, 1946     5 Sheets-Sheet 4
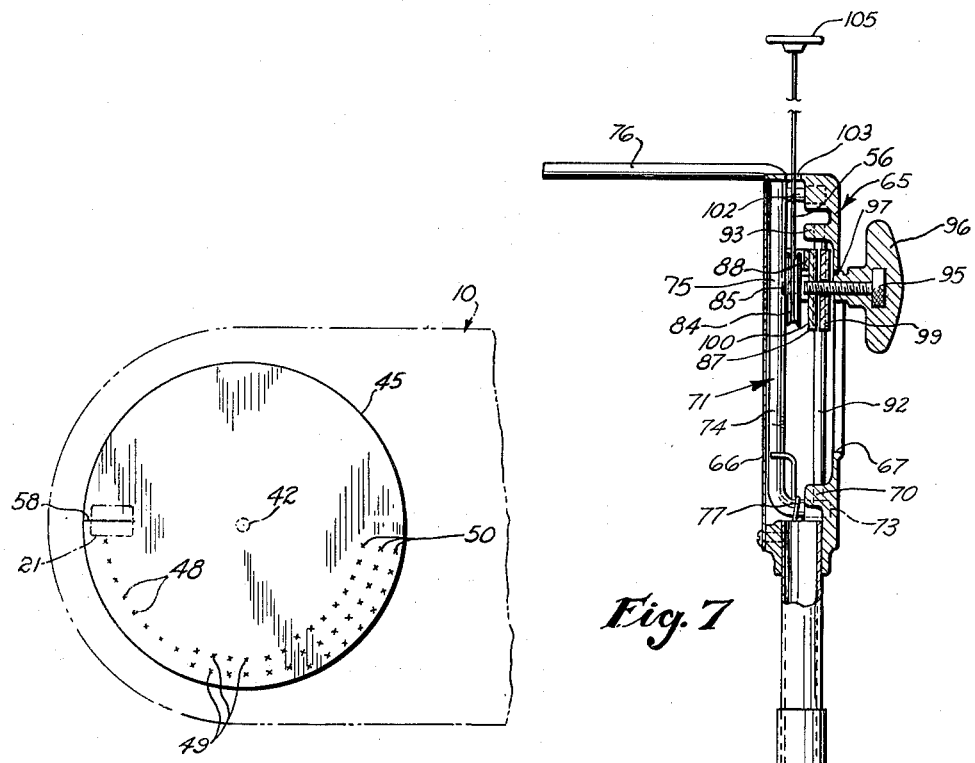
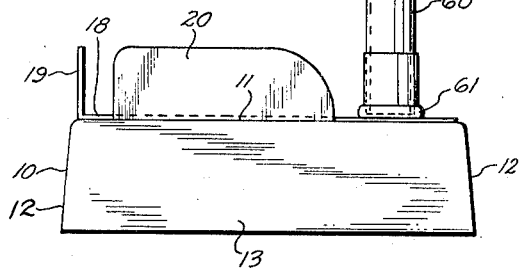
INVENTOR:
HENRY GILBERT
by his attorneys;
HARRIS, KIECH, FOSTER & HARRIS.

July 18, 1950 H. GILBERT 2,515,824
STOCKING SIZE GAUGE
Filed Nov. 9, 1946 5 Sheets-Sheet 5
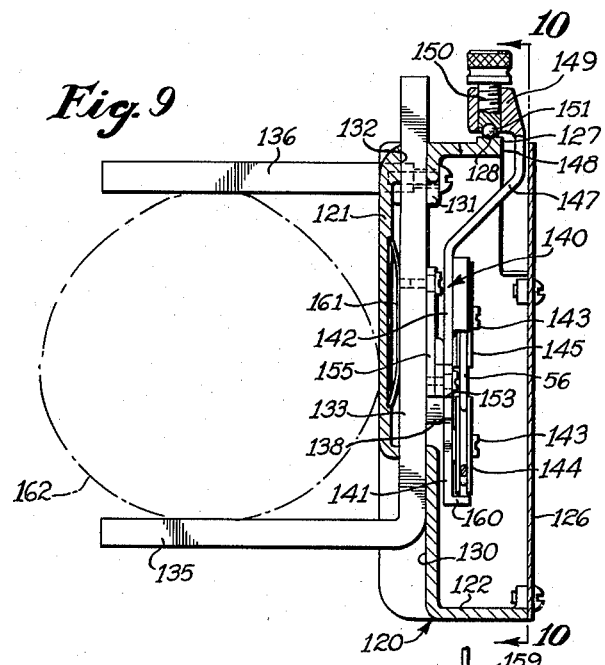
Fig. 9
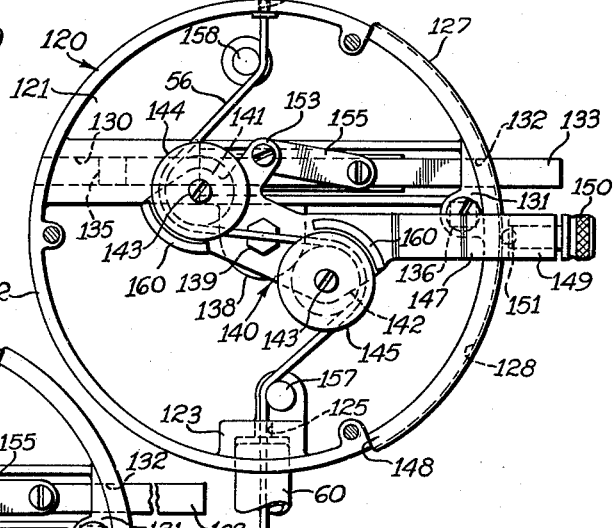
Fig. 10
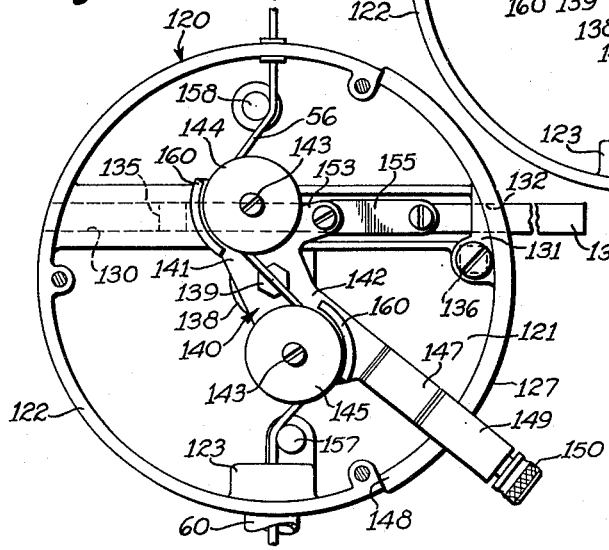
Fig. 11
INVENTOR:
HENRY GILBERT
by his attorneys;
HARRIS, KIECH, FOSTER & HARRIS.
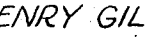

Patented July 18, 1950

2,515,824

UNITED STATES PATENT OFFICE 2,515,824

STOCKING SIZE GAUGE

Henry Gilbert, North Hollywood, Calif., assignor, by mesne assignments, to Gotham Hosiery Company, Inc., New York, N. Y., a corporation of Delaware Application November 9, 1946, Serial No. 708,885

25 Claims. (Cl. 33—2)

My invention relates to measuring or calculating devices and particularly to a device for determining the proper size of stockings to be worn by a person. Specifically, the invention pertains to a device adapted to accurately and quickly calculate the size stockings required to reach a predetermined height on legs of various proportions.

Full-fashioned hosiery is supplied in various lengths, widths and foot sizes by the manufacturer but because no suitable means has been heretofore devised for accurately calculating the size of stockings best suited to the individual, that is, with regard to all three of the dimensions referred to above, it is customary for the buyer of hosiery to order only by foot size and conventional lengths of leg. This method of selecting stockings often results in an improper fit thereof on the leg since the width of the stocking and gartering point are entirely disregarded. Thus, a full-fashioned fit is not readily obtained unless such stockings are custom made to the leg dimensions of the individual wearer.

It is a well known fact that the height to which a stocking will reach on a leg depends largely upon the perimeter or girth of the largest part of the lower portion of the leg, i. e., the size of the calf. For example, foot size has no relation to the size of the calf of the leg and therefore a person having a small foot sometimes has a large calf and a long leg or vice versa. Obviously, if the leg is long and large there will be a different degree of shortening of the stocking when fitted than when the leg is long and slender. In other words, it is essential that stockings having proper ratios between their widths and lengths be selected in order to effect a snug, comfortable fit thereof on the leg.

In the absence of suitable means for calculating the proportion between the length of the leg and the width thereof it has been necessary to measure both the length and calf of the leg of a prospective wearer by means of a tapemeasure or similar instrument and this has resulted in a laborious and time-consuming operation, besides requiring the use of a chart for transposing the linear values into terms of stocking sizes. It is small wonder, therefore, that the width of stockings is almost entirely disregarded and the hosiery selected on the basis of conventional foot sizes and standard leg lengths.

It is the primary object of my invention to provide a calculating device capable of quickly and accurately determining the exact height to which a stocking will reach on any leg, irrespective of variations in the girth of the leg, thereby enabling the sales clerk to supply a stocking which will extend to a desired height (for example, the correct gartering point) without actually fitting the stocking to the leg and without employing the usual trial-and-error method of determining correct stocking sizes.

Another object is to provide a device of the type indicated which is especially suitable for use in stores where hosiery is sold and which will positively determine the correct size of stockings to be worn by the individual buyer so that returns or exchanges of stockings due to improper fit will be eliminated and the good will of the customer established.

Another object is to provide a device of the character referred to having means for determining the girth of the leg, extensible measuring means adapted to measure the length of the leg which it is desired to cover, and compensating means for varying the amount of extension of the measuring means in accordance with the girth of the leg whereby to automatically indicate the exact length of stocking leg necessary to reach to the desired height on the leg of the wearer.

Another object is to provide a device having an indicator dial which is adapted to indicate various stocking lengths and which is operated by the extensible measuring means.

Another object is to provide a device of the type specified which is comparatively simple in construction, pleasing in appearance and highly efficient in performing its intended function.

Further objects of my invention will appear from the following specification and the drawings, which are intended for the purpose of illustration only, and in which:

Fig. 1 is a side elevational view of my stocking size calculating device, illustrating the method of applying it to use;

Fig. 2 is an enlarged side elevational view of the device with certain parts removed or broken away to show the internal structure thereof, the device being illustrated as adjusted for measuring a leg having a calf of small size;

Fig. 7 is an end view of the device, shown partly in section on line 7—7 of Fig. 2;

Fig. 8 is a plan view of the indicator disc;

Fig. 9 is a sectional plan view of the upper portion of a stocking size calculator of modified construction showing the calf gaging members in extended position for gaging a calf of relatively large size;

Fig. 10 is a rear sectional view taken on line 10—10 of Fig. 9; and

Fig. 11 is a view similar to Fig. 10 showing the relationship of the parts when the gaging members are adjusted to measure a calf of relatively small size.

My hosiery size calculating device comprises, in general, a base member adapted to support a person, spring-actuated wind-up means or drum on the base member, a flexible measuring means on the drum and adapted to be extended upwardly therefrom to position its end adjacent that part of the leg to which it is desirable that a stocking extend, movable indicating means on the base member operated by the drum and adapted to indicate the amount of extension of the measuring means from said drum, a casing supported from said base member and pivotally supporting gage members adapted to gage the thickness of the calf of the person standing upon the base member, pulleys in said casing around which the measuring means is looped, one of said pulleys being movable toward and away from the other of said pulleys to vary the length of the loop, the movable pulley being operatively connected to said gage members and adjusted thereby to vary the effective length of the measuring means and control the setting of the indicating means in accordance with various calf thicknesses.

In a modified form of construction herein disclosed my stocking size calculating device includes an alternative means for gaging the size of the calf to vary the effective length of the measuring means and control the setting of the indicating means in accordance with various calf thicknesses. In this alternative construction, one of the gage members is fixed upon the casing while the other gage member is adjustable toward and away from said fixed member to determine the size of the calf. The modified device employs a pair of pulleys around which the flexible measuring means extends, the pulleys being mounted on a common pivotal axis to adapt them to be adjusted angularly with respect to the line of movement of the measuring means whereby to vary the effective length of the measuring means. A single manually operable means is provided for simultaneously adjusting the pulleys angularly and adjusting the movable gage member with respect to the fixed gage member, said manually operable means being adapted to be locked to retain the parts in their different positions of adjustment.

Figure 4:
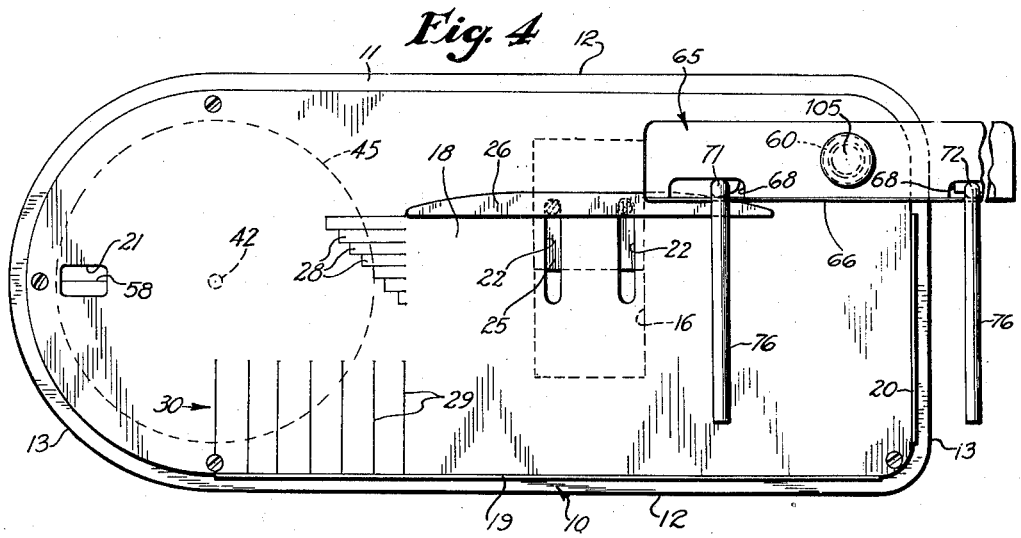
Fig. 4 is a top plan view of the device.
Figure 5:
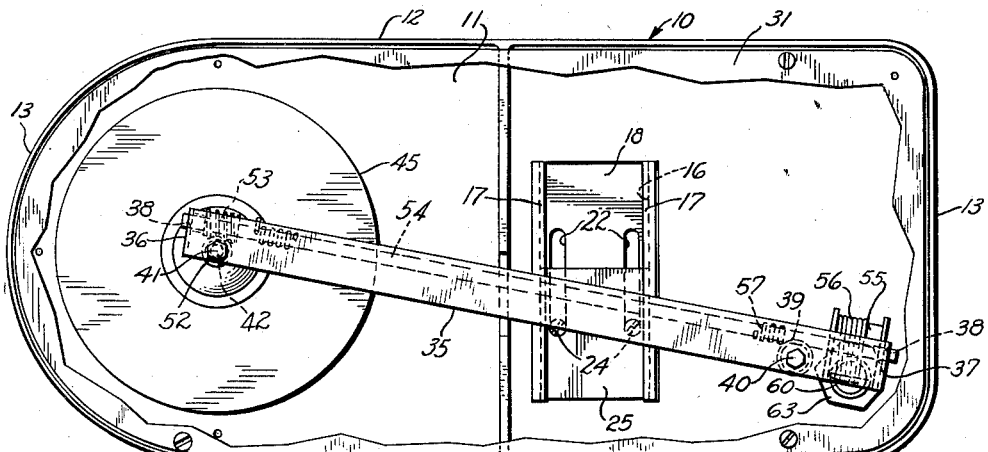
Fig. 5 is a bottom plan view thereof.

Referring to the drawings in detail, the present device comprises, essentially, a base member 10 which is preferably of inverted box-like form, being provided with a top wall 11 and depending side walls 12 and end walls 13 adapted to rest upon a floor or other surface. The base member 10 is substantially rectangular in plan view but its forward end is of semicircular outline (Fig. 4). Adjacent the rounded forward end of the base member 10 its top wall 11 is provided with a rectangular aperture 15 and substantially midway between its ends, the top wall has a transversely extending rectangular opening 16 provided with depressed ledges 17 (Fig. 2).

Fastened to the top of the base member 10 is a plate member or platform 18 having an upwardly projecting side flange 19 and a similar end flange 20. Adjacent its rounded end, the plate member 18 has a window 21 which registers with the aperture 15 of the base member. The plate member 18 is also provided with a pair of elongated slots 22 aligned with the opening 16 of the base member 10 and through which project screws 24 carried by a plate 25 arranged to rest upon the ledges 17 and to slide in the space between the ledges and the bottom surface of the platform 18. The screws 24 are screwed into holes in the bottom of an indicator plate 26 to adapt the indicator plate to be shifted laterally along the top of the plate member 18. The purpose of the indicator plate 26 is to indicate the width of the foot of a person being measured for hosiery, it being understood that the person rests one foot upon the platform 18 during the measuring operation. The foot of the person is so placed on the plate member 18 that the heel of the foot engages with the rearward end flange 20 and the inside of the foot abuts the side flange 19. With the foot thus disposed on the platform 18, the indicator plate 26 is shifted laterally into engagement with the outer side of the foot to register with one or another of several graduations 28 denoting various widths of the feet. The length of the foot may be determined by the markings 29 of a scale 30 on the plate member 18 (Fig. 4). The open bottom of the base member 10 is preferably closed by a cover member 31.

Mounted within the base member 10 is a sheet metal support member 35 having end flanges 36 and 37 which are provided with bearing apertures 38. One end of the support member 35 is attached to a boss 39 of the base member 10 by means of a screw 40 while the other end of the support member is secured thereto by means of a screw 41 passing through a hole in the support member and through a sleeve 42. The sleeve 42 is rotatably mounted on the screw 41 and secured to the sleeve is an indicator disc 45.

The disc 45 is marked with suitable graduations adapted to register with the window 21 so as to be visible therethrough. As shown in Fig. 8, the graduations may consist of a series of marks substantially equally spaced adjacent the periphery of the disc. The graduations extend throughout substantially 180° and preferably the semicircle thus formed is divided into three zones (Fig. 8). One zone is provided with a single arcuate row of marks 48, an adjacent zone has two concentric rows of marks 49 and the third zone has three concentric rows of marks 50. The single marks 48 may represent units of length corresponding with relatively short lengths of stockings, the marks 49 may signify that medium length stockings are necessary for a proper fit and the marks 50 may indicate that stockings of relatively long length are required in order to obtain a perfect fit.

Fast on the sleeve 42 is a worm wheel 52 which is adapted to be rotated by a worm 53 carried by a shaft 54 which is rotatable in the bearing apertures 38 of the support member 35. Adjacent the rearward end of the base member 10 the shaft 54 carries a take-up reel or drum 55 around which a flexible measuring member 56, preferably in the form of a cord, is wound. Surrounding the shaft 54 is a coil spring 57 having one of its ends secured to the shaft and its other end engaging the support member 35. The spring 57 normally tends to rotate the shaft 54 in a direction which will cause the indicator disc 45 to rotate in counterclockwise direction, as viewed in Fig. 8, to maintain an index mark 58 of the disc in register with the window 21 and to wind the cord 56 on the reel 55. When the cord is drawn off from the reel 55 the shaft 54 will be rotated in the reverse direction to cause successive marks 48, 49, or 50 to register with the window 21.

Projecting upwardly from the base member 10 adjacent its rearward end is a tubular post 60. As shown in Fig. 7, adjacent its lower end the post 60 is provided with a peripheral flange 61 which rests upon the top of the plate member 18 and below the flange is a threaded portion 62 which extends down through a hole in the plate member. A nut 63 screwed onto the threaded portion 62 and set up against the plate member 18 secures the post in position. Carried at the upper end of the post 60 is a casing 65 of substantially triangular shape in side view. The front side of the casing is normally closed by a cover 66. The rearward wall of the casing 65 is provided with a vertical slot 67 and the upper curved wall has a pair of spaced transverse openings 68.

Figure 6:
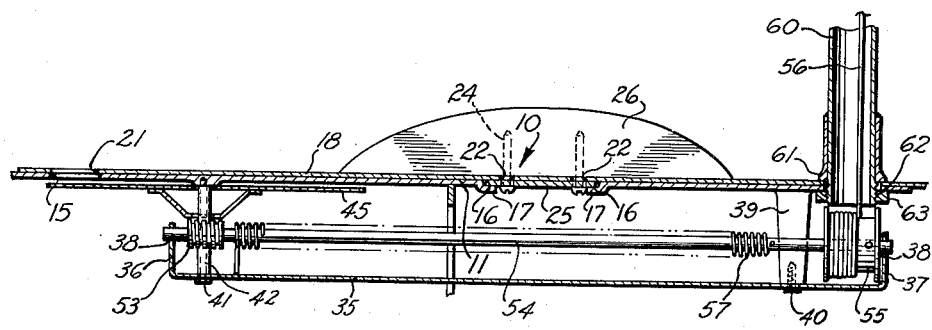
Fig. 6 is a longitudinal sectional view through the base of the device showing the drive for the indicating means.
Figure 3:
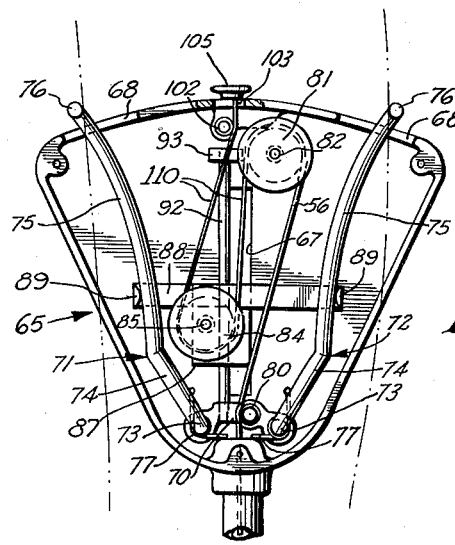
Fig. 3 is a view similar to Fig. 2, showing the relative positions of the upper parts of the device when measuring a leg having a calf of relatively large girth.

The casing 65 is provided with a boss 70 in its interior and pivotally mounted in holes in the boss are gage members 71 and 72 having horizontal portions 73 engageable in the holes and upwardly extending portions 74 which are provided with curved cam surfaces 75. The upper ends of the gage members 71 and 72 project outwardly through the openings 68 and are bent to provide lateral arms 76. The gage members 71 and 72 are normally pivoted in a direction to cause their arms 76 to separate as shown in Fig. 3 under the action of springs 77 coiled around the portions 73, each having an end engaging the casing 65 and another end engaging one of the members.

The boss 70 carries a horizontal pin 80 across which the measuring cord 56, extending through the post 60, leads. From the pin 80, the cord 56 passes upwardly to partially encircle a grooved pulley 81 rotatable on a stud 82 within the casing 65. The cord 56 leads downwardly from the pulley 81 to partially encircle a grooved pulley 84 which is adapted to be moved toward and away from the fixed pulley 81. The pulley 84 is rotatable on a pin 85 carried by a slide member 87 adapted to slide vertically within the casing 65. The slide member 87 is provided with a lateral arm 88 having fingers 89 at its ends adapted to engage the cam surfaces 75 of the gage members 71 and 72 to pivot the gage members inwardly toward each other against the action of the springs 77 when the slide member 87 is moved upwardly from the position shown in Fig. 3 to that illustrated in Fig. 2.

The slide member 87 is adapted to slide vertically on a rod 92, the lower end of which is held in the boss 70 while the upper end thereof is held in a lug 93 of the casing 65. Manually operated means are provided for sliding the member 87, Fig. 7 illustrating this means as comprising a binder-screw 95 having a knob 96 at one end. The knob has a hub portion 97 adapted to slide in the vertical slot 67 of the casing 65 and the screw 95 is threaded into the slide member 87. The slide member 87 is slit to provide clamping portions 99 and 100 (Fig. 7), the screw 95 passing through a clearance hole in one portion 99 and screwed into a threaded hole in the other portion 100 to cause the two portions to clamp the slide member to the rod 92.

After passing around the movable pulley 84, the cord 56 leads across a guide-pin 102 and thence through an aperture 103 in the top of the casing. The end of the cord 56 is provided with a handle 105 by means of which the cord may be drawn upwardly through the casing 65 and unwound from the drum 55. The hosiery size calculating device having been described in detail, the method of operation thereof is as next explained.

To determine the size of stockings which will reach to a desired height on the legs of a person, the sales clerk will make use of the present calculating device. The person being fitted will first remove a shoe from one foot and place this foot upon the platform 18 as shown in Fig. 1. The length and width of the foot may be determined by the scales 30 and 28, respectively. With the heel of the foot disposed against the flange 20, the leg will extend upwardly adjacent the post 60. The gage members 71 and 72 are normally pivoted outwardly as shown in Fig. 3 under the influence of the springs 77 and thus the leg will extend upwardly between the arms 76 of the gage members.

The first step in the operation of the device is to adjust the parts to the width or girth of the leg. This is accomplished by loosening the screw 95 slightly and sliding the slide member 87 upwardly in the casing 65. During this sliding movement the fingers 89 of the slide member 87, acting against the cam surfaces 75 of the gage members 71 and 72, will pivot the members inwardly toward each other (Fig. 2) in the manner of a caliper instrument. Eventually, the arms 76 will engage opposite sides of the calf of the leg and the knob 96 is then turned to cause the screw 95 to clamp the slide member 87 in adjusted position on the rod 92. During the upward sliding movement of the slide member 87 the pulley 84 mounted thereon is moved toward the fixed pulley 81 and thus the loop 110 of the cord 56 extending around the two pulleys is shortened to correspondingly reduce the length of cord between the drum 55 and the handle 105, it being noted that during this adjustment of the parts the handle is maintained in engagement with the top of the casing 65 under the action of the spring 57 which is operative to wind up the measuring cord on the drum 55. It will be apparent from the foregoing that the indicator disc 45 will be turned in counterclockwise direction, as viewed in Fig. 8, by the rotation of the shaft 54 and gear connection 53, 52 so that when the handle 105 is at rest against the top of the casing 65, the unmarked portion of the disc will be disposed adjacent the window 21.

After the gage members 71 and 72 have been adjusted to the size of the calf of the leg in the manner above explained, the handle 105 is grasped in the fingers and moved upwardly to that part of the leg to which the purchaser desires the stocking to reach. As the handle 105 is drawn upwardly, the cord 56 is unwound or extended from the wind-up drum 55, thus rotating the drum in a direction which causes the indicator disc 45 to turn in clockwise direction. The amount of withdrawal of the cord 56 from the drum 55 will determine the degree of rotation of the disc 45 and this movement is indicated by the particular marks on the disc which may be observed through the window 21. If the disc 45 is turned through only a small part of a revolution, one of the marks 48 will appear in the window 21, thus indicating to the sales clerk that a stocking having a relatively short leg length will reach the designated height on the leg. If the positioning of the handle 105 against the desired location on the leg acts to rotate the disc 45 to a position wherein any of the marks 49 or 50 are disposed below the window 21, such conditions will indicate that either a medium or long leg stocking will be necessary in order that the top of the stocking will reach to the designated position on the leg. It is apparent, therefore, that the proper length of stocking leg will be automatically and instantaneously calculated and indicated to the operator so that the proper size of stocking is readily established.

It has been stated that the required length of the leg of the stocking will be proportionate to the girth of the leg of the wearer at its widest part, that is, at the calf of the leg. For example, if the calf of the leg is of relatively large girth the stocking will shorten to a considerable extent when fitted to the leg of the wearer and thus in order to provide that the stocking will reach to a desired point it is necessary to use a stocking having a relatively long leg. On the other hand, if the calf of the leg of the wearer is of small girth the stocking will shorten to only a slight degree and thus a stocking having a shorter length may be used. My invention makes use of the gage members 71 and 72 for controlling the extent of rotation of the indicator disc 45 in accordance with the girth of the particular leg being measured. As previously explained, the position of the movable pulley 84 with respect to the stationary pulley 81 determines the size of the loop 110 produced in the cord 56 and thus the initial setting of the indicator disc is automatically effected by the setting of the gage members 71 and 72. Thus, by the simple operation of adjusting the gage members 71 and 72 to the size of the calf, the degree of rotation of the indicator disc 45, as effected by the extension of the cord 56 from the rotary drum 55, is controlled so that the length of stocking leg necessary to reach predetermined locations on legs having various girths may be readily determined. In lieu of the designations 48, 49 and 50, the indicator disc 45 may be provided with a graduated scale marked off in units of length such as inches and fractions of inches. It is also within the concept of my invention to provide a rectilinear scale operated by a rack and pinion or other driving means from the rotatable wind-up drum 55.

Referring now to Figs. 9, 10 and 11 of the drawings, my invention also provides a stocking size calculating device wherein the means for gaging the size of the calf is embodied in a modified form of construction. This alternative calf-gaging means includes a casing 120 of generally dish shape, having a forward wall 121 of circular configuration and a laterally extending peripheral rim 122. In its bottom portion the casing 120 has a boss 123 having a hole adapted to receive the upper end of the tubular post 60 to mount the casing on the post, the boss having a reduced hole 125 through which the flexible measuring member 56 is adapted to pass. The casing 120 normally is closed by a removable sheet metal cover 126 (Fig. 9) and a portion of the peripheral rim 122 of the casing is provided with a raised track 127 having a groove 128 in its peripheral surface. At one side of the casing, the front wall 121 is depressed to provide a horizontal guideway 130. At the opposite side of the casing 120 is an internal boss 131 having a square hole 132. Adapted to slide laterally in the guideway 130 and hole 132 is a bar 133 of square cross section, the bar 133 having a forwardly projecting gage arm 135. Secured in a hole in the boss 131 is a second gage arm 136 which also projects forwardly from the front face of the casing 120. The bar 133 is adapted to be slid laterally to adjust its arm 135 toward and away from the fixed gage arm 136 by means to be next described.

Held in a boss 138 within and at the center of the casing 120 is a pivot stud 129 on which is pivotally mounted an adjusting member 140. The member 140 has a pair of opposite arms 141 and 142 each carrying a stud 143 upon which grooved pulleys 144 and 145 are respectively mounted. The arm 142 is provided with a handle 147 which projects outwardly through an arcuate opening 148 in the rim 122 of the casing 120 adjacent the track 127. The outer end of the handle 147 has an offset boss 149 provided with a threaded hole through which a binder-screw 150 is adapted to be screwed. The inner end of the screw 150 has a hemispherical recess in which a ball 151 is arranged, the ball being adapted to travel in the arcuate groove 128 of the track 127. To pivot the adjusting member 140, the screw 150 is loosened and, with the head of the screw held between the fingers, the handle 147 is moved upwardly or downwardly to vary the angularity of the adjusting member, after which the screw is tightened to bind the ball 151 in the groove 128 to retain the member 120 in any position of adjustment. The arm 141 of the adjusting member 140 is provided with a finger 153 which is operatively connected to the bar 133 of the movable gage arm 135 by means of a link 155 so that angular movement of the adjusting member 140 causes lateral sliding movement of the gage arm 135.

The flexible measuring member 56, after entering the lower part of the casing 140, passes across a fixed pin 157, thence is looped over the grooved pulley 145 and under the grooved pulley 144 and then led upwardly across a fixed pin 158 from which point it leads out from the top of the casing through an opening 159. As in the embodiment first described, the flexible member 56 may be in the form of a cord provided with a handle 105. To retain the cord 56 within the grooves of the pulleys 144 and 145, the adjusting member 140 is provided with arcuate flanges 160 arranged concentric to and closely adjacent the peripheries of the pulleys. Arranged between the bar 133 of the gage arm 135 and the front wall 121 of the casing 120 is a leaf spring 161 for applying friction between these parts.

The modified form of device shown in Figs. 9, 10 and 11 operates in a manner similar to that previously described to adjust the gage arms to the thickness of the calf. When the person to be measured is standing upon the base member 10, one side of the calf 162 of the leg will be disposed against the fixed gage member 136 as indicated by the dot-and-dash line in Fig. 9, it being understood that before the measuring operation is started the gage member 135 is moved away from the fixed gage member 136 to accommodate the calf therebetween. To increase the gap between the gage members 135 and 136, the screw 150 is first loosened and the handle 147 swung upwardly to the position shown in Fig. 10 and as the compensating pulleys 144 and 145 are thus revolved about their common axis 139 in counter-clockwise direction, the adjusting member 140 acts, through the link 155, to slide the rod 133 toward the left as viewed in Fig. 10, to move the member 135 away from the member 136. When the calf 162 of the leg is located between the gage members 135 and 136, the handle 147 is rotated downwardly to cause the member 135 to move toward the member 136 until the calf is lightly embraced between these members, after which the thumb screw 150 is tightened to retain the parts in their positions of adjustment. As the gage arms 135 and 136 are thus regulated the length of the loop of cord extending around the pulleys 144 and 145 is either increased or decreased, according to the direction of movement of the pulleys and, as in the operation of the device shown in Figs. 1 through 8, this change in length is a determining factor in establishing the ratio between the size of the calf and the distance on the leg to which it is desired that the stocking extend. The modified form of calf measuring device shown in Figs. 9, 10 and 11 provides a simple, yet efficient means and may be quickly and readily applied to use by one not especially skilled in its operation.

While I have herein shown the stocking size calculating device as embodied in a preferred form of construction, by way of example, it will be understood that it may be modified in various particulars without departing from the spirit of the invention. Consequently, I do not desire to be limited by the foregoing specification, but desire to be afforded the full scope of the appended claims.

I claim as my invention:

1. A device for determining the proper size of stockings to be worn by a person, including: extensible, flexible measuring means for measuring the length of that portion of a leg to be enclosed in a stocking; movable indicating means actuated by said measuring means for indicating units of length; separate gaging means adjustable to the thickness of a portion of the leg below that portion of the leg to which it is desired that the stocking extend; and movable compensating means responsive to the setting of said gaging means for varying the amplitude of movement of said indicating means under the actuation of said measuring means.

2. A device for determining the proper size of stockings to be worn by a person, including: extensible, flexible measuring means for measuring the length of that portion of a leg to be enclosed in a stocking; rotatable indicating means actuated by said measuring means for indicating units of length; separate, independently operable, gaging means adjustable to the thickness of a portion of the leg below that portion of the leg to which it is desired that the stocking extend; and vertically movable compensating means responsive to the setting of said gaging means for varying the degree of rotation of movement of said indicating means under the actuation of said measuring means.

3. A device for determining the proper size of stockings to be worn by a person, including: extensible, flexible measuring means for measuring the length of that portion of a leg to be enclosed in a stocking; rotary indicating means actuated by said measuring means for indicating units of length; separate gaging means adjustable to the thickness of a portion of the leg below that portion of the leg to which it is desired that the stocking extend; and vertically movable compensating means operated by said gaging means for varying the amplitude of rotation of said indicating means under the actuation of said measuring means.

4. A device for determining the proper size of stockings to be worn by a person, including: a rotatable wind-up drum; an extensible, flexible measuring means wound on said drum and adapted to be unwound therefrom to measure the length of that portion of a leg to be enclosed in a stocking; movable indicating means disposed from and operatively connected to said drum and adapted to indicate the amount of extension of said measuring means from said drum; gaging means adapted to be adjusted to the thickness of a portion of the leg below that portion of the leg to which it is desired that the stocking extend; and compensating means operated by said gaging means for varying the effective length of said measuring means in accordance with various leg thicknesses.

5. A device for determining the proper size of stockings to be worn by a person, including: a spring-actuated wind-up drum; a flexible measuring means wound on said drum and adapted to be extended therefrom to permit its end to be positioned adjacent that part of the leg above the knee to which it is desirable that the stocking extend; movable indicating means spaced from and operatively connected to said drum and adapted to indicate the amount of extension of said measuring means from said drum; gaging means adapted to be adjusted to the thickness of the calf of the leg; and compensating means operated by said gaging means for varying the effective length of said measuring means in accordance with various calf thicknesses.

6. A device for determining the proper size of stockings to be worn by a person, including: a spring-actuated wind-up drum; a flexible measuring means wound on said drum and adapted to be extended therefrom to permit its end to be positioned adjacent that part of the leg to which it is desirable that the stocking extend; movable indicating means operated by said drum and adapted to indicate the amount of extension of said measuring means from said drum; gaging means adapted to be adjusted to the thickness of the calf of the leg; a movable pulley around which said measuring means extends, said pulley being adapted to be adjusted toward and away from said drum to vary the effective length of said measuring means; and connecting means between said gaging means and said pulley for adjusting the position of said pulley in accordance with various calf thicknesses.

7. A device for determining the proper size of stockings to be worn by a person, including: a spring-actuated wind-up drum; a flexible measuring means wound on said drum and adapted to be extended therefrom to permit its end to be positioned adjacent that part of the leg to which it is desirable that the stocking extend; movable indicating means operated by said drum and adapted to indicate the amount of extension of said measuring means from said drum; caliper means adapted to gage the thickness of the calf of the leg; a slide member movable toward and away from said drum; a pulley rotatably mounted on said slide member and around which said measuring means extends; and connecting means between said slide member and said caliper means, said connecting means being operative to adjust the position of said slide member in accordance with the setting of said caliper means to vary the effective length of said measuring means in accordance with various calf thicknesses.

8. A device for determining the proper size of stockings to be worn by a person, including: a spring-actuated wind-up drum; a flexible measuring means wound on said drum and adapted to be extended therefrom to permit its end to be positioned adjacent that part of the leg to which it is desirable that the stocking extend; movable indicating means operated by said drum and adapted to indicate the amount of extension of said measuring means from said drum; caliper means adapted to gage the thickness of the calf of the leg; a slide member movable toward and away from said drum; a pulley rotatably mounted on said slide member and around which said measuring means extends; connecting means between said slide member and said caliper means, said connecting means being operative to adjust the position of said slide member in accordance with the setting of said caliper means to vary the effective length of said measuring means in accordance with various calf thicknesses; and retaining means for retaining said slide member and said pulley in different positions of adjustment.

9. A device for determining the proper size of stockings to be worn by a person, including: a base member adapted to support a person; a spring-actuated wind-up drum on said base member; a flexible measuring means wound on said drum and adapted to be extended upwardly therefrom to permit its end to be positioned adjacent that part of the leg to which it is desirable that the stocking extend; movable indicating means on said base member operated by said drum and adapted to indicate the amount of extension of said measuring means from said drum; a vertical post on said base member; a casing on said post; a pair of gage members pivoted in said casing and adapted to be pivoted toward and away from each other to gage the thickness of the calf of the person standing upon said base; a slide member movable in said casing and connected to said gage members; a rotatable pulley carried by said movable slide member; and a second rotatable pulley fixedly mounted within said casing, said measuring means extending from said drum over said second pulley and under said movable pulley, and said slide member being adjustable vertically and connected to simultaneously pivot said gage members and move said movable pulley toward and away from said fixed pulley to vary the effective length of said measuring means in accordance with various calf thicknesses.

10. A device for determining the proper size of stockings to be worn by a person, including: a base member adapted to support a person; a spring-actuated wind-up drum on said base member; a flexible measuring means wound on said drum and adapted to be extended upwardly therefrom to permit its end to be positioned adjacent that part of the leg to which it is desirable that the stocking extend; movable indicating means on said base member operated by said drum and adapted to indicate the amount of extension of said measuring means from said drum; a vertical post on said base member; a casing on said post; a pair of curved gage members pivoted in said casing and adapted to be pivoted toward and away from each other to gage the thickness of the calf of the person standing upon said base; a slide member movable in said casing; arms on said slide member engageable with said gage members; a rotatable pulley carried by and movable with said slide member; and a second rotatable pulley fixedly mounted within said casing, said measuring means extending from said drum over said second pulley and under said movable pulley, and said slide member being adjustable vertically and connected to simultaneously pivot said gage members and move said movable pulley toward and away from said fixed pulley to vary the effective length of said measuring means in accordance with various calf thicknesses.

11. A device as defined in claim 10 having resilient means for normally pivoting said gage members in a direction away from each other.

12. A device as defined in claim 10 in which said gage members are provided with cam portions engageable with said arms.

13. A device as defined in claim 10 in which said measuring means is provided with a pull-knob normally held in engagement with the upper end of said casing under the action of said wind-up drum.

14. A device as defined in claim 10 in which said gage members are provided with lateral arms adapted to engage against opposite sides of the calf.

15. A device for determining the proper size of stockings to be worn by a person, including: a base member adapted to support a person; a spring-actuated wind-up drum on said base member; a flexible measuring means wound on said drum and adapted to be extended upwardly therefrom to permit its end to be positioned adjacent that part of the leg to which it is desirable that the stocking extend; movable indicating means on said base member and adapted to indicate the amount of extension of said measuring means from said drum; a gear drive between said drum and said indicating means; a vertical post on said base member; a casing on said post; a pair of gage members pivoted in said casing and adapted to be pivoted toward and away from each other to gage the thickness of the calf of the person standing upon said base; a slide member movable in said casing and connected to said gage members; a rotatable pulley carried by said movable slide member; and a second rotatable pulley fixedly mounted within said casing, said measuring means extending from said drum over said second pulley and looped under said movable pulley, and said slide member being adjustable vertically and connected to simultaneously pivot said gage members and move said movable pulley toward and away from said fixed pulley to vary the effective length of said measuring means in accordance with various calf thicknesses.

16. A device for determining the proper size of stockings to be worn by a person, including: a base member adapted to support a person; a driven shaft rotatable on said base member; an indicator disc on said shaft, said disc having indicia representing units of length and registrable with an index on said base member; a drive shaft on said base member; a drum on said drive shaft; a flexible measuring means wound on said drum and adapted to be unwound therefrom to permit its end to be positioned adjacent that portion of the leg to which it is desirable that the stocking extend; spring means operative to normally rotate said drive shaft in a direction to wind said measuring means onto said drum; gear drive connections between said drive shaft and said driven shaft whereby rotation of said drum rotates said indicator disc, said indicator disc being adapted to indicate the amount of extension of said measuring means from said drum; a vertical post on said base member; a casing on said post; a pair of gage members pivoted in said casing and adapted to be pivoted toward and away from each other to gage the thickness of the calf of the person standing upon said base; a slide member movable in said casing and connected to said gage members; a rotatable pulley carried by said movable slide member; and a second rotatable pulley fixedly mounted within said casing, said measuring means extending from said drum over said second pulley and under said movable pulley, and said slide member being adjustable vertically and connected to simultaneously pivot said gage members and move said movable pulley toward and away from said fixed pulley to vary the effective length of said measuring means in accordance with various calf thicknesses.

17. In a stocking size calculator, the combination of: flexible length determining means adapted to be adjusted vertically to determine the required stocking length of a human leg; separate, independently operable, girth determining means adapted to be adjusted laterally to determine the required stocking girth of the calf of said leg; and means interconnecting said length determining means and said girth determining means and automatically operable in response to said lateral adjustments thereof to indicate the correct stocking size for said leg.

18. In a stocking size calculator, the combination of: flexible length determining means adapted to be adjusted vertically to determine the required stocking length of a human leg; separate, independently operable, girth determining means adapted to be adjusted laterally to determine the required stocking girth of a portion of said leg below the knee; and means movable independently of and interconnecting said length determining means and said girth determining means and automatically operable in response to said lateral adjustments thereof to indicate the correct stocking size for said leg.

19. In a stocking size calculator, the combination of: flexible length determining means adapted to be adjusted vertically to determine the required stocking length of a human leg; separate, independently operable, girth determining means adapted to be adjusted laterally to determine the required stocking girth of the calf of said leg; and means movable with respect to and interconnecting said length determining means and said girth determining means and automatically operable in response to said lateral adjustments thereof to indicate the correct stocking size for said leg.

20. In a stocking calculator, the combination of: extensible, flexible length determining means adapted to be extended vertically to determine the required stocking length of a human leg; a separate, independently operable, girth determining means adapted to be adjusted laterally to determine the required stocking girth of the calf of said leg; and independently movable means interconnecting said length determining means and said girth determining means and automatically operable in response to said lateral adjustments to vary the effective length of said extensible length determining means to indicate the correct stocking size for said leg.

21. A device for determining the proper size of stockings to be worn by a person, including: a rotatable wind-up drum; an extensible, flexible measuring means wound on said drum and adapted to be unwound therefrom to measure the length of that portion of a leg to be enclosed in a stocking; movable indicating means spaced from and operated by said drum and adapted to indicate the amount of extension of said measuring means from said drum; separate, independently operable, gaging means adapted to be adjusted to the thickness of the calf of the leg; and compensating means operatively connected to said gaging means for varying the effective length of said measuring means in accordance with various calf thicknesses.

22. A device for determining the proper size of stockings to be worn by a person, including: a rotatable wind-up drum; an extensible measuring means wound on said drum and adapted to be unwound therefrom to measure the length of that portion of a leg to be enclosed in a stocking; movable indicating means operated by said drum and adapted to indicate the amount of extension of said measuring means from said drum; gaging means adapted to be adjusted to the thickness of the calf of the leg; and rotary compensating means operatively connected to said gaging means for varying the effective length of said measuring means in accordance with various calf thicknesses.

23. A device for determining the proper size of stockings to be worn by a person, including: a rotatable wind-up drum; an extensible measuring means wound on said drum and adapted to be unwound therefrom to measure the length of that portion of a leg to be enclosed in a stocking; movable indicating means operated by said drum and adapted to indicate the amount of extension of said measuring means from said drum; slidable gaging means adapted to be adjusted to the thickness of the calf of the leg; and rotary compensating means operatively connected to said gaging means for varying the effective length of said measuring means in accordance with various calf thicknesses, rotary movement of said compensating means effecting sliding movement of said gaging means.

24. A device for determining the proper size of stockings to be worn by a person, including: a rotatable wind-up drum; an extensible measuring means wound on said drum and adapted to be unwound therefrom to measure the length of that portion of a leg to be enclosed in a stocking; movable indicating means operated by said drum and adapted to indicate the amount of extension of said measuring means from said drum; relatively slidable gage members adapted to be adjusted to the thickness of the calf of the leg; rotary compensating means operatively connected to said gaging means; and means operable to simultaneously rotate said compensating means and relatively slide said gage members, said compensating means being operative to vary the effective length of said measuring means in accordance with various calf thicknesses.

25. A device for determining the proper size of stockings to be worn by a person, including: a rotatable wind-up drum; an extensible measuring means wound on said drum and adapted to be unwound therefrom to measure the length of that portion of a leg to be enclosed in a stocking; movable indicating means operated by said drum and adapted to indicate the amount of extension of said measuring means from said drum; a fixed gage member; a slidable gage member slidable toward and away from said fixed gage member to gage the thickness of the calf of the leg; a pivoted adjusting member provided with a handle; a pair of compensating pulleys rotatable on said adjusting member around which said extensible measuring means is looped; and a link connected between said adjusting member and said slidable gage member, pivotal movement of said adjusting member and pulleys acting to simultaneously vary the effective length of said measuring means in accordance with various calf thicknesses and to adjust the position of said slidable gage member.

HENRY GILBERT.

REFERENCES CITED

The following references are of record in the file of this patent:

UNITED STATES PATENTS

| Number | Name | Date |
|---|---|---|
| 1,926,581 | Clarke | Sept. 12, 1933 |
| 2,078,368 | Brannock | Apr. 27, 1937 |
| 2,110,895 | Verdier | Mar. 15, 1938 |
| 2,125,530 | Verdier | Aug. 2, 1938 |
| 2,181,930 | Wheeler | Dec. 5, 1939 |
| 2,332,723 | Infield | Oct. 26, 1943 |

FOREIGN PATENTS

| Number | Country | Date |
|---|---|---|
| 595,554 | France | Oct. 5, 1925 |
| 837,822 | France | Feb. 21, 1939 |